C. L. FRINK.
SAFETY-VALVE.
Reissued April 11, 1876.
No. 7,048.
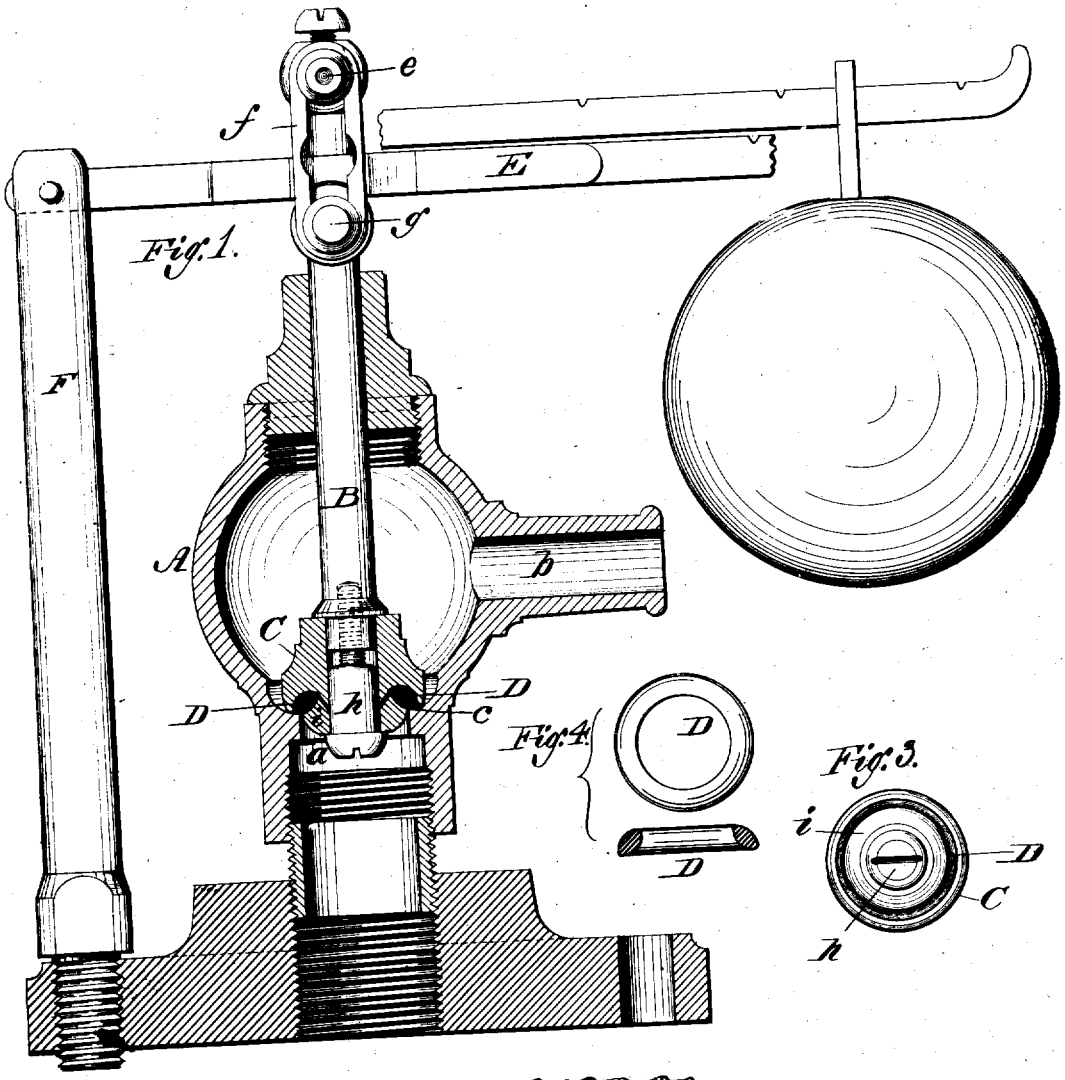
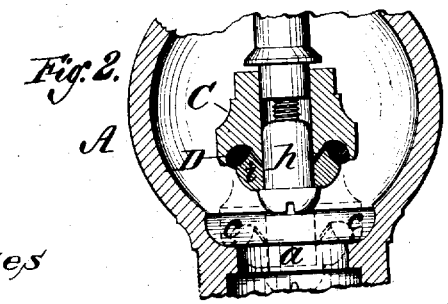
Witnesses
Will W. Dodge.
Donn P. Twitchell.
Inventor
Oscar T. Earle
assignee of
C. L. Frink

UNITED STATES PATENT OFFICE

C. L. FRINK, OF ROCKVILLE, ASSIGNOR, BY MESNE ASSIGNMENTS, TO OSCAR T. EARLE, OF NORWALK, CONNECTICUT.

IMPROVEMENT IN SAFETY-VALVES.

Specification forming part of Letters Patent No. 55,639, dated June 19, 1866; reissue No. 7,048, dated April 11, 1876; application filed March 11, 1876.

*To all whom it may concern:*

Be it known that C. L. FRINK, of Rockville, in the county of Tolland and State of Connecticut, did invent certain new and useful Improvements in Valves; and I do hereby declare that the following is a full, clear, and exact description thereof, reference being had to the accompanying drawings, making part of this specification, and to the letters of reference marked thereon—like letters indicating like parts wherever they occur.

To enable others skilled in the art to construct and use said invention, I will proceed to describe it.

This invention consists in the combination of a swinging support with the stem and lever of a safety-valve, in such a manner that the said supporter will accommodate itself to the position of the lever, and the lateral strain on the valve-stem will be diminished or avoided; it also consists in making the standard which supports the fulcrum of the lever adjustable in such manner that it can be readily accommodated to the length of the valve-stem, and thereby the lever readily brought to a horizontal position; and it also finally consists in the employment of a molded elastic packing-ring, and in the manner of mounting, securing, and protecting the same, whereby the valve is cheapened, the durability and efficiency of the packing increased, and its application and removal facilitated.

Figure 1 represents a longitudinal central section of the valve closed; Fig. 2, a section, through the body or valve proper, opened; Fig. 3, a bottom face view of the spindle or valve proper; Fig. 4, a view showing a plan and a cross-section of the packing-ring.

A represents the body or shell of the valve, made in a globular or spherical form, with an inlet-passage, *a*, and an outlet-passage, *b*, and with an annular valve-seat bearing, *c*, around the mouth of the inlet, as shown. B represents the stem or spindle, having its lower end provided with the head or valve proper C, arranged to shut down upon the seat *c* and close the inlet-passage, and provided with an elastic packing-ring, D, in its lower face to insure a tight joint. The stem B is extended out through a stuffing-box in the top of the shell or body, and connected with a weighted lever, E, which has one end pivoted to the rigid standard F, as shown. The manner in which the stem is connected with the lever is clearly shown in Fig. 1, in which *e* represents a cross-bar rigidly attached to the stem, and provided at its ends with two pendent links, *f*, which sustain the ends of a second cross-bar, *g*, on which the lever bears. The bar *g* is provided with a large opening in the middle to admit the stem, and permit the bar to move laterally, while the lever is also provided with a central opening, and slipped over and around the stem so as to bear equally on both ends of the bar.

By thus sustaining the lever-support in the swinging links, I prevent the rise and fall of the lever from causing a lateral strain on the stem. In order that the lever may be readily adjusted to a horizontal position, regardless of the length of the valve-stem, the standard F has its lower end provided with a screw-neck, which admits of its being raised and lowered as required. The valve-head consists of a metal head, having an annular groove in its under face to receive a molded elastic packing ring, (shown in Fig. 4,) which is secured in place by a central screw, *h*. The packing is so arranged that when the valve is closed it fits down tightly upon the seat, as shown in Fig. 1, producing in conjunction with the metal head, which also fits down upon or close to the seat, a perfectly tight joint. By arranging the valve-head so that it comes in contact with the seat the destructive crushing of the packing is prevented, while at the same time sufficient compression is permitted to insure a tight joint. The plate *i* is made of a diameter equal to or very slightly less than that of the inlet-passage or throat *a*, so that when the valve is shut, as shown in Fig. 1, the plate fitting within the throat closes the same nearly tight, and covers and protects the packing against the destructive action of the steam or fluid, the only portion of the packing exposed being the narrow line or belt over the annular space, which exists between the edge of the valve-head and the seat. The grooved head, fitting over and around the packing, protects and sustains the same, holds it firmly in position, retains it in proper shape, and insures a tight close fit upon the seat.

When the valve is open, the packing is protected by the metal head and plate from the destructive action of the rapidly-passing current, which, when under high velocity, rapidly cuts away and disintegrates an unprotected packing.

The outside surrounding head protects the exterior of the ring, while the plate serves as a deflector, and throws the currents outward, clear of the face of the packing. By inclosing the packing, as above described, between the valve-head and plate, in such manner that it is protected both when the throat or passage is open and when it is closed, the durability and efficiency of the packing are greatly increased.

By employing the packing in the form of a ring, and seating it in the groove in the head, I economize material, and give the packing a better support.

By molding or casting the packing-rings they are produced rapidly, cheaply, and of uniform size, so as to fit with nicety and accuracy.

It is obvious that this manner of applying the packing and arranging the valve are in no way dependent for their efficiency upon any special form or construction of the body, nor upon any special manner of mounting or operating the valve-head or spindle, and that consequently the improvements are applicable to valves of every kind and form in which it is desired to produce a close joint between a metal valve or head and its seat or bearing.

Having thus described the invention, what is claimed is—

1. The cross-bars *e* and *g*, and links *f*, in combination with the valve-stem and lever, as shown and described.

2. The central screw *h*, and clamping-plate *i*, in combination with the valve.

3. In a valve held to its seat by positive pressure, the combination of a seat or bearing and a metal valve or head provided with an elastic packing, so constructed that when the valve is closed the packing and the metal both bear upon the seat, producing a combined metallic and elastic joint.

4. A valve or valve-head provided with a molded annular elastic packing, held in place by a clamping-plate, substantially as and for the purpose specified.

5. In a valve, held to its seat by positive pressure, the combination of a seat or bearing, and a valve or head provided with an elastic packing inclosed by the metal in such a manner that when the valve is open the bearing-surface of the packing is the only portion exposed to the action of the passing current.

6. In combination with the annular seat, the valve provided with the elastic packing D and metallic surface *i*, the former adapted to fit against the seat, and the latter arranged to enter and close the throat or inlet for the purpose of protecting the packing.

7. A valve provided with an elastic packing to bear upon the valve-seat, and with a metal plate entering and closing the valve throat or passage, for the purpose of protecting the packing, substantially as shown and described.

OSCAR T. EARLE,
*Assignee, by mesne assignments, of C. L. Frink.*

Witnesses:
P. T. DODGE,
WILL. W. DODGE.